United States Patent
Isaksson et al.

(10) Patent No.: US 9,372,081 B2
(45) Date of Patent: Jun. 21, 2016

(54) METHOD AND SYSTEM FOR GEO-REFERENCING AT LEAST ONE SENSOR IMAGE

(71) Applicant: Vricon Systems Aktiebolag, Linkoeping (SE)

(72) Inventors: Folke Isaksson, Linkoeping (SE); Johan Bejeryd, Linkoeping (SE); Per Carlbom, Linkoeping (SE); Ingmar Andersson, Linkoeping (SE); Johan Borg, Linkoeping (SE); Leif Haglund, Brokind (SE)

(73) Assignee: Vricon Systems Aktiebolag, Linkoeping (SE)

( * ) Notice: Subject to any disclaimer, the term of this patent is extended or adjusted under 35 U.S.C. 154(b) by 0 days.

(21) Appl. No.: 14/233,972

(22) PCT Filed: Jan. 21, 2013

(86) PCT No.: PCT/SE2013/050042
§ 371 (c)(1),
(2) Date: Jan. 21, 2014

(87) PCT Pub. No.: WO2014/112909
PCT Pub. Date: Jul. 24, 2014

(65) Prior Publication Data
US 2015/0317828 A1    Nov. 5, 2015

(51) Int. Cl.
*G06K 9/00* (2006.01)
*G01C 11/06* (2006.01)
*G06T 17/05* (2011.01)
(Continued)

(52) U.S. Cl.
CPC .............. *G01C 11/06* (2013.01); *G01C 11/025* (2013.01); *G06K 9/0063* (2013.01); *G06K 9/6203* (2013.01); *G06K 9/6289* (2013.01);
(Continued)

(58) Field of Classification Search
None
See application file for complete search history.

(56) References Cited

U.S. PATENT DOCUMENTS 6,587,601 B1 * 7/2003 Hsu .................. G01C 11/00
                                              382/154
7,242,460 B2 * 7/2007 Hsu .................. G06K 9/3241
                                              356/4.01

(Continued)

FOREIGN PATENT DOCUMENTS

EP    1418402 A1    5/2004

OTHER PUBLICATIONS

Simonson et al. "A Statistics Based Approach to Binary Image Registration with Uncertainty Analysis", Jan. 2007, IEEE Pattern Analysis and Machine Intelligence, vol. 29, No. 1.*

(Continued)

*Primary Examiner* — Jason Heidemann
(74) *Attorney, Agent, or Firm* — Alston & Bird LLP

(57) ABSTRACT

Various embodiments relate to a method (700) and system for geo-referencing at least one sensor image. The method comprises the steps of: generating at least one sensor image of a first scene with at least one sensor, accessing a 3D model of the environment comprising geo-coded 3D coordinate data and related to at least one second scene, said second scene encompassing said first scene, matching the sensor image with the 3D model find a section of the 3D model where there is a match between the first and the second scenes, geo-referencing the sensor image based on the geo-coded 3D coordinate data of the found section of the 3D model, and determining a measure related to an uncertainty in the matching between the sensor image and the 3D model.

17 Claims, 3 Drawing Sheets

(51) Int. Cl.
*G06T 7/00* (2006.01)
*G01C 11/02* (2006.01)
*G06K 9/62* (2006.01)

(52) U.S. Cl.
CPC .............. *G06T7/0024* (2013.01); *G06T 17/05* (2013.01); *G06T 2207/30184* (2013.01)

(56) References Cited

U.S. PATENT DOCUMENTS

| | | | |
|---|---|---|---|
| 7,424,133 B2 | 9/2008 | Schultz et al. | |
| 7,555,143 B2* | 6/2009 | Flath | G06T 5/006 348/143 |
| 7,944,547 B2* | 5/2011 | Wang | G01C 11/00 356/3.01 |
| 2001/0038718 A1* | 11/2001 | Kumar | G06T 3/0081 382/284 |
| 2003/0218675 A1 | 11/2003 | Nonoyama | |
| 2007/0058885 A1 | 3/2007 | Leib et al. | |
| 2007/0127101 A1 | 6/2007 | Oldroyd | |
| 2009/0115779 A1* | 5/2009 | Shulman | G01B 11/2513 345/419 |
| 2012/0257792 A1 | 10/2012 | Simon | |
| 2012/0262552 A1* | 10/2012 | Zhang | G06F 17/30855 348/47 |

OTHER PUBLICATIONS

Domokos et al., "Parametric estimation of affine deformations of binary images", 2008, Proceedings of IEEE International Conference on Acoustics, Speech, and Signal Processing.*

International Searching Authority, International Search Report and Written Opinion for International Application No. PCT/SE2013/050042, mailed Oct. 30, 2013, 9 pages, Swedish Patent and Registration Office, Sweden.

* cited by examiner

Sensor image 3D model section

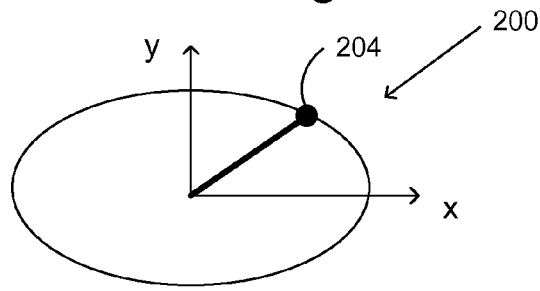
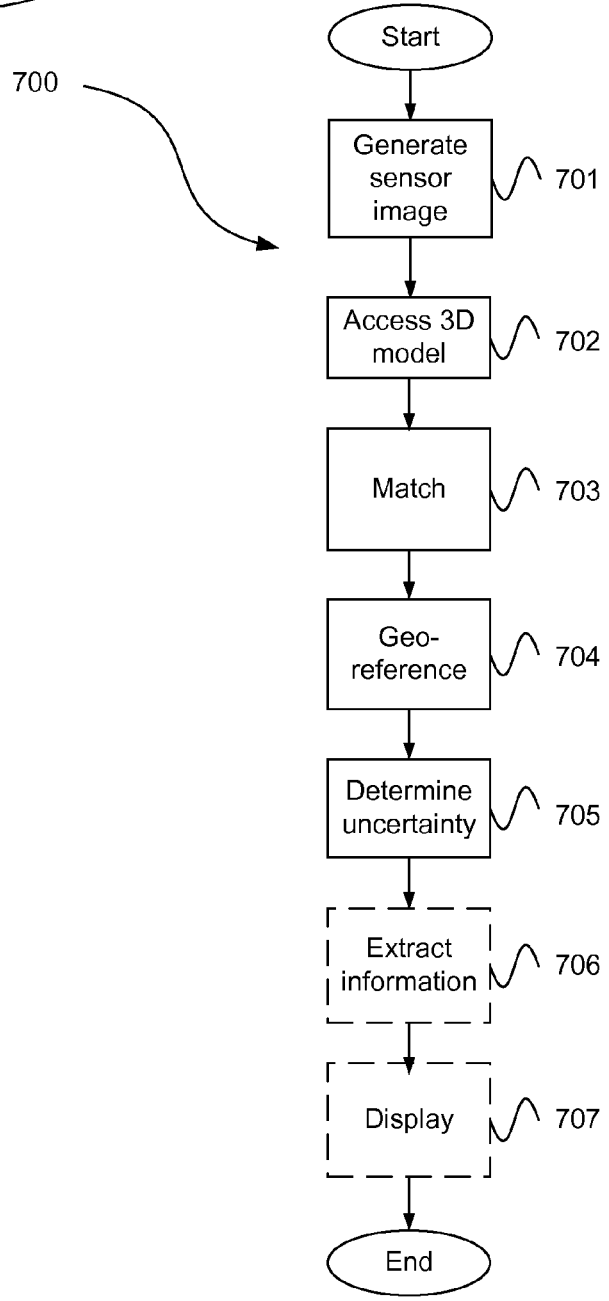

METHOD AND SYSTEM FOR GEO-REFERENCING AT LEAST ONE SENSOR IMAGE

CROSS REFERENCE TO RELATED APPLICATIONS

This application is a national stage application, filed under 35 U.S.C. §371, of International Application No. PCT/SE2013/050042, filed Jan. 21, 2013, the contents of which are hereby incorporated by reference in its entirety.

BACKGROUND

1. Related Field

The present invention relates to a method and system for geo-referencing at least one sensor image

2. Description of Related Art

US 2003/0218675 describes a video picture processing method intending to take a shot of a ground surface from a video camera mounted on an airframe in the air and identify situations existing on the ground surface. The method comprises the steps of specifying three-dimensionally a photographic position in the air, computing a photographic range of the ground surface having been shot; transforming a video picture in conformity with the photographic range; and displaying the transformed picture in such a manner as being superimposed on a map of a geographic information system.

BRIEF SUMMARY

One object of the present invention is to provide improved accuracy in the geo-referencing of a picture or sensor image. Another object of the present invention is to provide a measure of the accuracy of the geo-referencing of the image.

This has in one example been achieved by means of a method for geo-referencing at least one sensor image. The method comprises generating said at least one sensor image of a first scene with at least one sensor, accessing a 3D model of the environment comprising geo-coded 3D coordinate data and related to at least one second scene, said second scene encompassing said first scene, matching the sensor image with the 3D model find a section of the 3D model where there is a match between the first and the second scenes, geo-referencing the sensor image based on the geo-coded 3D coordinate data of the found section of the 3D model, and determining a measure related to an uncertainty in the matching between the sensor image and the 3D model. The matching may involve positioning and rotating the sensor image in the 3D model. The geo-coded 3D coordinate data may be given in a geo-referenced coordinate system.

In using the method for geo-referencing, the quality of the geo-referencing of a sensor image using the 3D model, can be certified. The user can evaluate whether provided geographical position information related to the sensor image data is reliable (enough)

In one option, the measure related to the uncertainty in the matching is determined for the sensor image as a whole. The measure related to the uncertainty in the matching in one example determined as a distance value and in another example determined as a percentage.

In one option, the method comprises determining a similarity between the sensor image and the found section of the 3D model, determining similarities between the sensor image and sections of the model adjacent to the found section and determining the measure related to the uncertainty based on a comparison between the determined similarities.

In one option, the step of determining a measure related to an uncertainty comprises comparing substantially all points in the sensor image with a corresponding point in the model and forming an accuracy measure based on the distance between each respective point in the sensor image and the corresponding point in the model.

In one option, the determination of the measure related to an uncertainty comprises comparing the sensor image with the corresponding section in the 3D model and determining a probability that the matching between the model and the sensor image is correct.

The measure related to an uncertainty may instead or in addition be provided for each of at least one point in the sensor image. In one option in accordance with this embodiment, the measure related to the uncertainty comprises comparing at least one point in the sensor image with a corresponding point in the 3D model and forming the measure related to the uncertainty based on the distance between the at least one point in the sensor image and the corresponding point in the model.

In one option, the determining of the measure related to the uncertainty is based on a determined model uncertainty.

The method comprises in one option a step of extracting the coordinate information and the associated measure related to the uncertainty related to a selected point in the sensor image.

The 3D model of the environment may comprise a mesh describing the environment and comprising nodes interconnected by means of edges and surfaces boarded by the edges, wherein each node and/or edge and/or surface is associated to geo-coded 3D coordinate data and the associated measure related to the uncertainty. The 3D model, such as in the example with a mesh, may be textured.

In one embodiment of the present invention a program code for geo-referencing at least one sensor image comprises the following steps.

generating said at least one sensor image of a first scene with at least one sensor, accessing a 3D model of the environment comprising geo-coded 3D coordinate data and related to at least one second scene, said second scene encompassing said first scene, matching the sensor image with the 3D model find a section of the 3D model where there is a match between the first and the second scenes, geo-referencing the sensor image based on the geo-coded 3D coordinate data of the found section of the 3D model, and determining a measure related to an uncertainty in the matching between the sensor image and the 3D model.

In one embodiment of the present invention a computer program product comprising a program code stored on a computer readable media for geo-referencing at least one sensor image and comprising the following steps.

generating said at least one sensor image of a first scene with at least one sensor, accessing a 3D model of the environment comprising geo-coded 3D coordinate data and related to at least one second scene, said second scene encompassing said first scene, matching the sensor image with the 3D model find a section of the 3D model where there is a match between the first and the second scenes, geo-referencing the sensor image based on the geo-coded 3D coordinate data of the found section of the 3D model, and determining a measure related to an uncertainty in the matching between the sensor image and the 3D model.

In one embodiment of the present invention, a system for geo-referencing at least one sensor image comprises at least one sensor arranged to capture at least one image of the first scene, means for accessing a 3D model comprising geo-coded 3D coordinate data, and a processing unit arranged to accessing the 3D model, to match the sensor image with the 3D model so as to find a section of the 3D model where there is a match, to geo-reference the sensor image based on the geo-coded 3D coordinate data of the found section of the 3D model, and to determine a measure related to an uncertainty in the matching between the sensor image and the 3D model.

DETAILED DESCRIPTION OF THE DRAWINGS

FIG. 6 is a schematic illustration of an uncertainty related to a 3D model

FIG. 7 is a flow chart illustrating an example of a method for geo-referencing a sensor image.

DETAILED DESCRIPTION OF VARIOUS EMBODIMENTS

Figure 1:
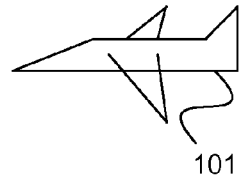
FIG. 1 illustrates schematically a first moving image sensor carrying platform.
Figure 1:
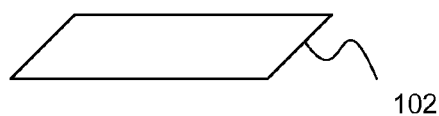

In FIG. 1, an object forming a sensor carrier 101 or a sensor carrying platform is moving in a terrain. In the illustrated example, the object is an aerial object. The aerial object is for example a manned aerial vehicle or an unmanned aerial vehicle. The aerial vehicle may be a helicopter, an aircraft or the like. The object may also be for example land based. The object may be a person or an animal.

The sensor carrier 101 carries a sensor arranged to generate a sensor image of a scene with at least one sensor. The sensor is arranged to captures images of a first scene 102. In one example the sensor is arranged to continuously capture images of the first scene as the sensor carrying object is moving. In one example, the sensor is arranged to scan the terrain. The sensor may be a video camera. The sensor may in an alternative example be arranged to capture images of the scene at preset time intervals or in a single shot.

The generated sensor images can then be geo-referenced. This involves accessing a 3D model of the environment comprising geo-coded 3D coordinate data and related to a second scene. The second scene encompasses the first scene. The sensor image is matched with the second scene to find a corresponding section of the second scene. Further, accuracy in the matching between the sensor image and the found section of the model is determined.

Figure 2:
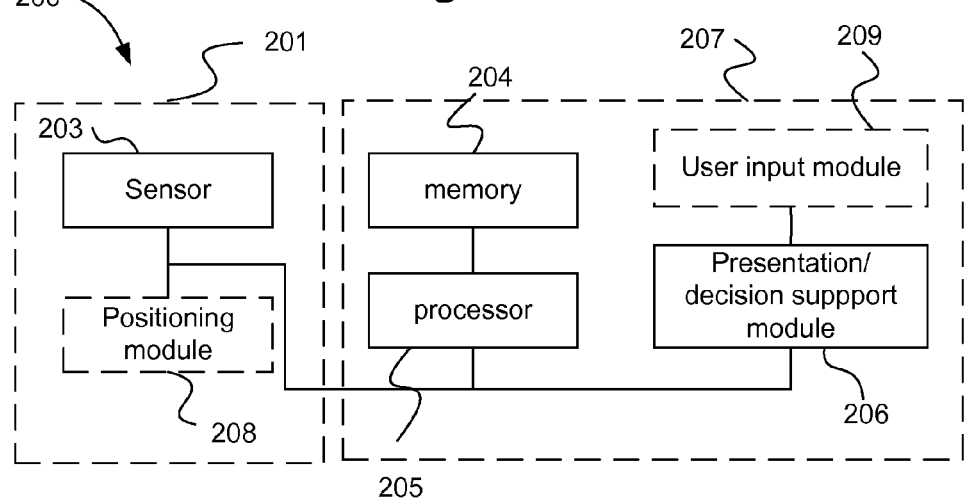
FIG. 2 is a block scheme illustrating an example of a system for geo-referencing a sensor image.

In FIG. 2, a system 200 comprises a sensor carrier 201 carrying an image sensor 203.

The sensor carrier 201 may also comprise a positioning module 208. The positioning module may comprise equipment for determining the position of the sensor carrier 201 in a geo-referenced coordinate system. The equipment for determining the position of the sensor carrier 201 comprises for example a GPS receiver and/or accelerometers and/or gyros. The positioning module 208 may also comprise equipment for determining a pointing direction of the sensor(s) 203. Determining the pointing direction of a sensor is well known in the art and may be based on information from for example accelerometers and/or gyros. In one example, the positioning module comprises a user input module (not shown) for manual input of information related to the position of the sensor carrier and or the pointing direction of the sensor.

A processing module 205 is arranged to receive information from the positioning module related to the position of the sensor carrier and possibly also the pointing direction of the sensor(s) carried by the sensor carrier. The processing module 205 has access to a 3D model of the environment. In the illustrated example, the 3D model is stored in a memory 204. In one example, the 3D model is at least partly stored in a memory at a remote location. The processing module has access to those parts of the 3D module via a communication channel.

The 3D model comprises 3D coordinate data given in a geo-referenced coordinate system. The 3D model may further comprise texture information. The 3D model may comprise substantially all visible surfaces (above a certain size) in the surrounding seen from any angle. Thus, substantially all surfaces in the surrounding exceeding a certain size are associated to 3D coordinate data given in the geo-referenced coordinate system. Further, also texture data may be associated to all surfaces in the surrounding exceeding a certain size. The geo-referenced coordinate data may comprise latitude data, longitude data and height data and may be associated to texture information. A detailed example of a 3D model is described in relation to FIG. 5.

The processing module 205 is arranged to extract from the 3D model data related to a second scene based on information provided from the positioning module 208. As is described above, the information from the positioning module comprises position information and possibly also information related to a moving direction of the sensor carrier and/or a pointing direction of the sensor. The processing module is arranged to select the second scene such that it is ensured that it encompasses the first scene. Thus, the size of the second scene is selected based on the uncertainty of the data from the positioning module 208. The processing module is arranged to perform processing of the sensor image and the 3D model data related to the second scene. The processing involves matching the sensor image with the 3D model data related to a second scene to map the sensor image onto the 3D model data related to the second scene. The matching involves positioning and rotating the sensor image in the model and changing intrinsic parameters such as field of view and/or radial distortion. The matching involves for example feature matching. The feature matching then involves matching identified features in the sensor image with texture information of the section of the 3D model related to the second scene.

The processing module 205 may further be arranged to identify discrepancies between the model and the information in the sensor image. The discrepancies may be identified by means of additional information. The additional information may comprise information relating to addition and/or removal of at least one object in the sensor image in relation to the corresponding 3D mode and/or information relating to at least one texture deviation in the sensor image in relation to the corresponding 3D model. The additional information may instead or in addition thereto comprise information related to a difference in shape and/or size of at least one object in the sensor image in relation to the corresponding 3D model. The information related to the texture information may for example comprise information related to if the sensor mage and the 3D model were provided at different seasons and/or weather conditions. The matching between the sensor image and the 3D model can then be performed based on the additional information.

When the matching has been performed, and the sensor image is matched a corresponding section in the second scene, the generated sensor image is then geo-referenced.

The processing module 205 is further arranged to determine a measure related to an uncertainty in the matching between the sensor image and the 3D model and thus in the geo-coded information associated to the sensor image as a result of the matching. The measure related to the uncertainty in the matching is one example determined for the sensor image as a whole. In an alternative or complementary example, the measure related to an uncertainty is provided for each of at least one point in the sensor image In one example, the measure related to the uncertainty in the matching is determined as a distance value. In one example, the measure related to the uncertainty in the matching is determined as a percentage.

The processing module 205 may be implemented at the sensor carrier 201. However, it can also be implemented elsewhere. Alternatively, different parts of the processing module 205 may be formed on different locations. The 3D model may be stored as a whole or in part at the sensor carrier 201. Alternatively, it is stored elsewhere.

The system 2001 may comprise a presentation and/or decision support module 206 and a user input module 209. In one example, the presentation and/or decision support module comprises a display arranged to display the sensor image. The user input module 209 may then comprise for example a computer mouse or a touch screen on the display for marking a position or area in the displayed sensor image. The display and/or decision support module 206 is then arranged to extract coordinate information from the sensor image related to the selected position/area along with associated uncertainty measure. This coordinate information may then be used by other systems.

The display may then be arranged to display information related to a plurality of sensor images covering a wider geographical area. The user input module 209 may then, as described above, be used for marking an arbitrary position or area in the displayed sensor image and/or a position or area associated to additional information. The display and/or decision support module 206 is then arranged to extract coordinate information from the sensor image related to the selected position/area along with associated uncertainty measure. In one example, the display is arranged to display the sensor image in a map, wherein the 3D model of the memory 204 can be used for providing data to the displayed map surrounding the sensor image. The displayed sensor image may be continuously updated as the sensor carrier moves or the sensor is turned.

Figure 3:
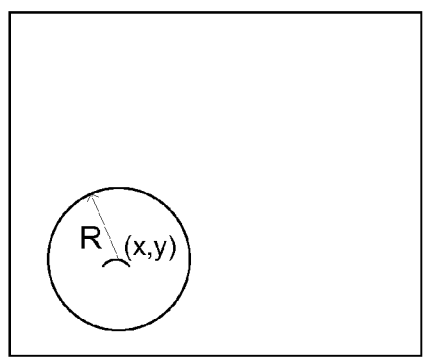
FIG. 3 illustrates schematically a first example of determining an accuracy related to the geo-referencing of a sensor image based on a sensor image and a corresponding 3D model section.
Figure 3:
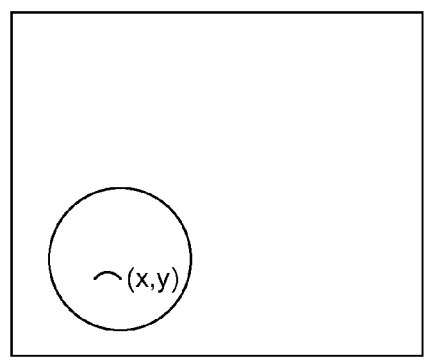

In FIG. 3, it is illustrated one way of determining the uncertainty measure for the matching between the sensor image and the found section of the 3D model. In the illustrated example, a geo-coded sensor image and a matched section of the 3D model projected to two dimensions is shown.

In FIG. 3, the procedure for determining the uncertainty in the matching between the sensor image and the found section of the model is illustrated for one coordinate in the geo-coded sensor image. However, in practice the accuracy is determined for a plurality of coordinates in the geo-coded sensor image. In one example, the accuracy is determined for all coordinates in the geo-coded sensor image.

In FIG. 3, the accuracy is determined by matching a part of the geo-coded sensor image with a corresponding fraction 3D model. In the illustrated example, for each coordinate x, y of the geo-coded sensor image for which the accuracy of the positioning information is determined, an area around the examined coordinate x, y is formed. Characteristically, the area is substantially smaller than the size of the sensor image itself. In the illustrated example, the area is selected as a circle having a radius R and a centre at the examined coordinate x, y. The radius R may be defined as a predetermined number of pixels. A corresponding area in the corresponding model section is then searched for the corresponding location. The search is performed based on feature matching and/or correlation using techniques known in the art. The x, y coordinate of the corresponding location in the 3D model section is then compared to the coordinate x, y in the sensor image. Based thereon, the processing unit can be arranged to form a distance between the coordinates in the sensor image and the corresponding 3D model section. The distance $r_i$ at coordinate i between the coordinates in the sensor image and the corresponding 3D model section can be defined as $$r_i = \sqrt{dx^2 + dy^2}$$

The distance is then provided for N coordinates (or pixels) in the sensor image. In one example, the number N equals to the number of pixels in the sensor image. In alternative example, a subset of the pixels of the sensor image are selected for performing a distance value.

Then, a value for the accuracy of the geo-coding of the image can be formed based on the values $r_i$ for $1 \leq i \leq N$ and based on the number N of coordinates examined.

In one example, the accuracy value is determined as $$r_m = \sqrt{\frac{\sum_{i=1}^{N} r_i^2}{N}}$$

In one example, the denominator of the equation above is another value based on the number N of coordinates examined. In one example the distances $r_i$ are weighted in the sum so that the geo-coding accuracy is more important in some portions of the sensor image than in others.

The size of the area is selected such that the "average distance" represented by the accuracy value $r_m$ should lie well within the boarder of the area if the sensor image and the 3D model section relate to the same scene. The size of the area is selected based on the accuracy of the information from the position module. In one example, size of the area is selected based on the quality of the 3D model, the sensor image etc. (When the area is the circle with the radius R, the average distance" represented by the accuracy value $r_m$ should be substantially smaller than the radius R. For example, the average distance" represented by the accuracy value $r_m$ should based on the selection of R be smaller than half of R. If $r_m$ is close to or equal to R, this is an indication that the sensor image and the 3D model selection do not correspond to the same scene in reality. Thus, the quota $$\frac{r_m}{R}$$

represents a measure of an uncertainty in the in the geo-coding of the sensor image.

Figure 4:
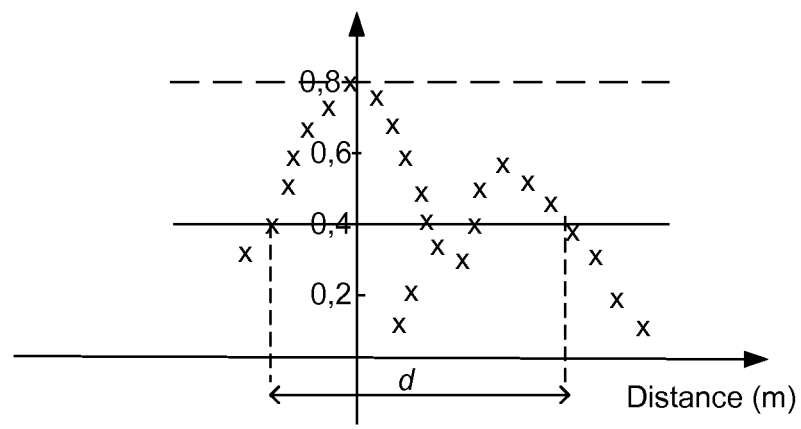
FIG. 4 illustrates schematically a second example of determining an accuracy related to the geo-referencing.

FIG. 4 illustrates another way of determining the accuracy in the geo-coded image. In the illustrated example, for illustrative purposes, the determination is performed in one plane.

However, the same principle applied when performing the procedure in a plane. In accordance with this example, the same a similarity measure for the whole image and the corresponding 3D model section is determined. The similarity measure can be determined using any known technique. In the illustrated example a value for the similarity measure between the sensor image and the corresponding 3D model section is determined to be 0.8. Then, the similarity measure is then calculated for a plurality of "measurement points" wherein the 3D model section is displaced a determined displacement distance for each measurement. In this case the displacements are only made in one dimension. Thus, a plurality of measurement points are provided, one for each displacement of the 3D model section. Then, the uncertainty value in meters is then provided for the whole sensor image based on these similarity measurements.

In the illustrated example the uncertainty measure is determined as a distance d within which the similarity measure exceeds a predetermined value. In the illustrated the uncertainty measure is determined as one distance defined by the end point of one or a plurality of intervals within which the predetermined value is exceeded. The predetermined value may be determine as a percentage of the value determined for the selected 3D model (i.e., 0.8 in the illustrated example). The percentage is for example 50 percent.

Figure 5:
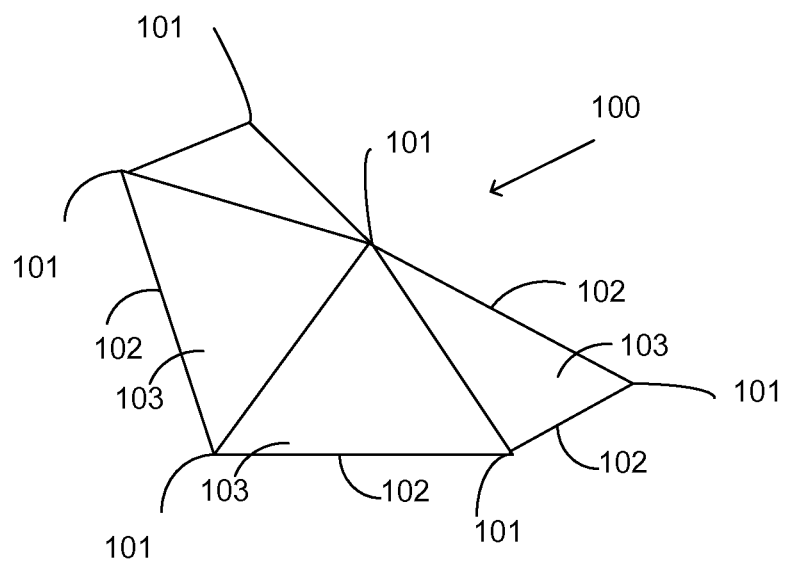
FIG. 5 is a schematic illustration of an example of a 3D model.

In FIG. 5, a 3D model for describing an environment is formed as a mesh 100. The mesh 100 comprises a plurality of nodes 101 interconnected by means of edges 102. Surfaces 103 are provided boarded by the edges 102 of the mesh 100. The nodes 101 are each associated to a 3D coordinate in a geographical coordinate system. The surfaces 103 are in one example each associated to texture information. In one example, the surfaces are also each associated to 3D coordinate data in the geographical coordinate system. Further, a mesh uncertainty is associated to at least a subset of the nodes of the mesh. The mesh uncertainty associated to each respective node represents the uncertainty at that specific point of the model. In one example, the mesh uncertainty is associated to each node of the mesh.

Instead, or in addition thereto, at least a subset of the surfaces and/or edges can be associated to a mesh uncertainty. In one example, one mesh uncertainty is associated to each surface and/or edge. Alternatively, each surface and/or edge is associated to a plurality of mesh uncertainty values. For example, the mesh uncertainty values of the edges/surfaces are determined based on interpolation between neighbouring nodes.

In FIG. 6, an uncertainty associated to the mesh is illustrated. A value 204 for the mesh uncertainty is given in at least two directions. In the illustrated example, the mesh uncertainty value 204 is given in two dimensions. The uncertainty value in each direction is represented as a distance or another value related to the distance. In one example, the uncertainty is represented as a value and possibly also direction in the plane of the surface and as a value in a direction perpendicular to the plane of the surface. In accordance with this example, each uncertainty is represented in relation to the associated local plane given by the surface of the mesh. When the uncertainty is given in space, the uncertainty defines a sphere, the size and shape of which is given by the uncertainty value in each respective direction. In one example when the mesh uncertainty is given in three dimensions, it is represented as a 3×3 matrix. In one example when the mesh uncertainty is given in two dimensions, it is represented as a 2×2 matrix. In an alternative example, the mesh uncertainty is given as a percentage associated to substantially each node/edge/surface of the mesh.

Thus, the mesh is associated to mesh uncertainties. The mesh uncertainties can be illustrated. For example the uncertainties can be illustrated by means of colour coding of the mesh. For example, the texture can then be removed and replaced with the colour coding based on the mesh uncertainties. It is then illustrated in which parts of the model the mesh uncertainties are acceptable and in which parts they are not. It is then possible for a user of the model to know where in the geography the model is more reliable and where it is less reliable and also providing a measure of the reliability. In one example, the texture of the mesh can be presented along with the mesh uncertainties. In one example, the texture is presented in black and white. The texture may be presented in a semi-transparent manner. In determining the measure related to an uncertainty in the matching between the sensor image and the 3D model, the uncertainty associated to the mesh can be taken into account.

In FIG. 7, a method 700 for geo-referencing at least one sensor image comprises the following steps.

matching the sensor image with the 3D model to find a section of the 3D model where there is a match between the first and the second scenes, geo-referencing the sensor image based on the geo-coded 3D coordinate data of the found section of the 3D model, and determining a measure related to an uncertainty in the matching between the sensor image and the 3D model.

In a first step 701, at least one sensor image of a first scene is generated with at least one sensor. In one example, the sensor image comprises a depth map.

In a next step 702, information related to at least one second scene is accessed, said second scene encompassing said first scene. This step involves accessing a 3D model comprising geo-coded 3D coordinate data. In one example, the 3D model comprises coordinate data given in a geo-referenced coordinate system. The 3D model may be textured.

Thereafter, the sensor image is matched 703 with the 3D model to find a section of the 3D model where there is a match between the first and the second scenes. The matching involves in one example positioning and rotating the sensor image in the 3D model and changing intrinsic parameters such as field of view and/or radial distortion. The matching may involve matching texture information of the sensor image with texture information related to the second scene.

The sensor image is then geo-referenced 704. The geo-referencing comprises using geo-coded 3D coordinate data of the found section of the 3D model and associating said geo-coded 3D coordinate data to the corresponding part of the sensor image.

Thereafter, a measure related to an uncertainty in the matching between the sensor image and the 3D model is determined 705. In one example, the measure related to the uncertainty in the matching is determined as a distance value. In an additional or complementary example, the measure related to the uncertainty in the matching is determined as a percentage. The measure related to the uncertainty in the matching may be determined for the sensor image as a whole. Alternatively, or in addition thereto, the measure related to the uncertainty is provided for each of at least one point in the sensor image.

In the illustrated example, the method further comprises a step of extracting 706 coordinate information and the associated measure related to the uncertainty related to a selected point in the sensor image.

The method may further comprise a step 707 of displaying the sensor image. Selecting means can then be used for selecting at least one point in the sensor image. Coordinate information and the associated measure related to the uncertainty related to this selected point in the sensor image can then be extracted and displayed.

The step of determining 705 a measure related to an uncertainty in the matching between the sensor image and the 3D model comprises in one example determining a similarity between the sensor image and the found section of the 3D model, determining similarities between the sensor image and sections of the model adjacent to the found section and determining the measure related to the uncertainty based on a comparison between the determined similarities.

The step of determining 705 a measure related to an uncertainty in the matching between the sensor image and the 3D model comprises in one example comparing substantially all points in the sensor image with a corresponding point in the model and forming an accuracy measure based on the distance between each respective point in the sensor image and the corresponding point in the model.

The step of determining 705 a measure related to an uncertainty in the matching between the sensor image and the 3D model comprises in one example comparing the sensor image with the corresponding section in the 3D model and determining a probability that the matching between the model and the sensor image is correct.

The step of determining 705 a measure related to an uncertainty in the matching between the sensor image and the 3D model comprises in one example comparing at least one point in the sensor image with a corresponding point in the 3D model and forming the measure related to the uncertainty based on the distance between the at least one point in the sensor image and the corresponding point in the model.

The invention claimed is:

1. Method (700) for geo-referencing at least one sensor image, said method comprising the steps of:
   generating (701) said at least one sensor image of a first scene with at least one sensor;
   accessing (702) a 3D model of the environment comprising geo-coded 3D coordinate data and related to at least one second scene, said second scene encompassing said first scene;
   matching (703) the sensor image with the 3D model to find a section of the 3D model where there is a match between the first and the second scenes;
   geo-referencing (704) the sensor image based on the geo-coded 3D coordinate data of the found section of the 3D model; and
   determining (705) a measure related to an uncertainty in the matching between the sensor image and the 3D model,
   wherein:
      the 3D model of the environment comprises a textured mesh describing the environment, the textured mesh comprising nodes interconnected via edges and surfaces boarded by the edges; and
      each node and/or edge and/or surface is associated to geo-coded 3D coordinate data and texture data.

2. Method according to claim 1, wherein the matching (703) involves positioning and rotating the sensor image in the 3D model and changing intrinsic parameters such as at least one of field of view or radial distortion.

3. Method according to claim 1, wherein the determination (705) of the measure related to an uncertainty comprises:
   comparing the sensor image with the corresponding section in the 3D model; and
   determining a probability that the matching between the model and the sensor image is correct.

4. Method according to claim 1, further comprising a step of extracting (706) coordinate information and the associated measure related to the uncertainty related to a selected point in the sensor image.

5. Method according to claim 1, wherein the determining of the measure related to the uncertainty is based on a model uncertainty.

6. Method according to claim 1, wherein the geo-coded 3D coordinate data is given in a geo-referenced coordinate system.

7. Method (700) for geo-referencing at least one sensor image, said method comprising the steps of:
   generating (701) said at least one sensor image of a first scene with at least one sensor;
   accessing (702) a 3D model of the environment comprising a textured mesh describing the environment, said 3D model comprising geo-coded 3D coordinate data and texture data, and being related to at least one second scene, said second scene encompassing said first scene;
   matching (703) the sensor image with the 3D model to find a section of the 3D model where there is a match between the first and the second scenes;
   geo-referencing (704) the sensor image based on the geo-coded 3D coordinate data of the found section of the 3D model; and
   determining (705) a measure related to an uncertainty in the matching between the sensor image and the 3D model,
   wherein the measure related to the uncertainty in the matching is determined (705) for the sensor image as a whole.

8. Method according to claim 7, wherein the measure related to the uncertainty in the matching is determined as a distance value.

9. Method according to claim 7, wherein the measure related to the uncertainty in the matching is determined as a percentage.

10. Method according to claim 7, further comprising the steps of:
    determining a similarity between the sensor image and the found section of the 3D model;
    determining similarities between the sensor image and sections of the model adjacent to the found section; and
    determining (705) the measure related to the uncertainty based on a comparison between the determined similarities.

11. Method according to claim 7, wherein the determining (705) of a measure related to an uncertainty comprises:
    comparing all points in the sensor image with a corresponding point in the model; and
    forming an accuracy measure based on the distance between each respective point in the sensor image and the corresponding point in the model.

12. Method (700) for geo-referencing at least one sensor image, said method comprising the steps of:
    generating (701) said at least one sensor image of a first scene with at least one sensor;
    accessing (702) a 3D model of the environment comprising a textured mesh describing the environment, said 3D model comprising geo-coded 3D coordinate data and texture data, and being related to at least one second scene, said second scene encompassing said first scene;
    matching (703) the sensor image with the 3D model find a section of the 3D model where there is a match between the first and the second scenes;

geo-referencing (704) the sensor image based on the geo-coded 3D coordinate data of the found section of the 3D model; and determining (705) a measure related to an uncertainty in the matching between the sensor image and the 3D model, wherein the measure related to an uncertainty is provided for each point in the sensor image.

13. Method according to claim 12, wherein the determination (705) of the measure related to the uncertainty comprises:

comparing each point in the sensor image with a corresponding point in the 3D model; and forming the measure related to the uncertainty based on the distance between each point in the sensor image and the corresponding point in the model.

14. Method (700) for geo-referencing at least one sensor image, said method comprising the steps of:

generating (701) said at least one sensor image of a first scene with at least one sensor;

accessing (702) a 3D model of the environment comprising geo-coded 3D coordinate data and related to at least one second scene, said second scene encompassing said first scene;

matching (703) the sensor image with the 3D model find a section of the 3D model where there is a match between the first and the second scenes;

geo-referencing (704) the sensor image based on the geo-coded 3D coordinate data of the found section of the 3D model; and determining (705) a measure related to an uncertainty in the matching between the sensor image and the 3D model, wherein the 3D model of the environment comprises a mesh describing the environment and comprising nodes interconnected by means of edges and surfaces boarded by the edges, wherein each node and/or edge and/or surface is associated to geo-coded 3D coordinate data and the associated measure related to the uncertainty.

15. Method according to claim 14, wherein the 3D model is textured.

16. A non-transitory computer program product for geo-referencing at least one sensor image, the computer program product comprising at least one computer-readable storage medium having computer-readable program code portions embodied therein, the computer-readable program code portions comprising:

an executable portion configured for generating said at least one sensor image of a first scene with at least one sensor;

an executable portion configured for accessing a 3D model of the environment comprising geo-coded 3D coordinate data and related to at least one second scene, said second scene encompassing said first scene, said 3D model of the environment comprising a textured mesh describing the environment, the textured mesh comprising nodes interconnected via edges and surfaces boarded by the edges, each node and/or edge and/or surface being associated to geo-coded 3D coordinate data and texture data;

an executable portion configured for matching the sensor image with the 3D model find a section of the 3D model where there is a match between the first and the second scenes;

an executable portion configured for geo-referencing the sensor image based on the geo-coded 3D coordinate data of the found section of the 3D model; and an executable portion configured for determining a measure related to an uncertainty in the matching between the sensor image and the 3D model.

17. System (200) for geo-referencing at least one sensor image, said system comprising:

at least one sensor (203) arranged to capture at least one image of the first scene;

a memory (204) for storing a 3D model of the environment comprising geo-coded 3D coordinate data, said 3D model of the environment comprising a textured mesh describing the environment, the textured mesh comprising nodes interconnected via edges and surfaces boarded by the edges, each node and/or edge and/or surface being associated to geo-coded 3D coordinate data and texture data; and a processing unit (205) configured to access the 3D model, to match the sensor image with the 3D model so as to find a section of the 3D model where there is a match, to geo-reference the sensor image based on the geo-coded 3D coordinate data of the found section of the 3D model, and to determine a measure related to an uncertainty in the matching between the sensor image and the 3D model.

* * * * *